(No Model.)
I. ST. C. GOLDMAN.
COUPLING.
No. 461,751. Patented Oct. 20, 1891.
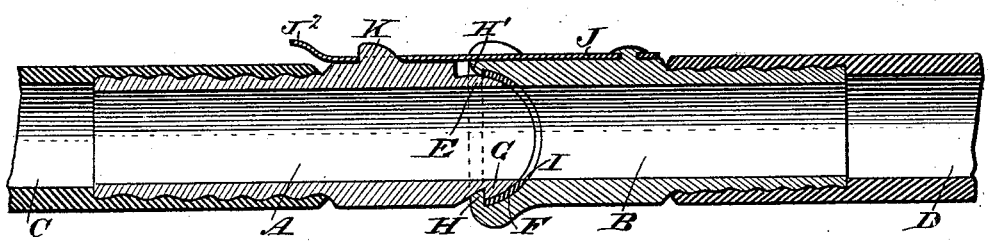
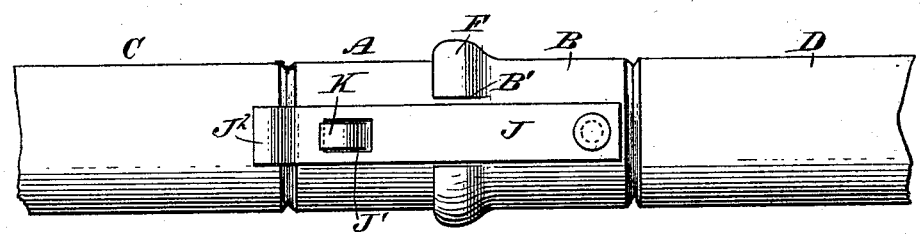
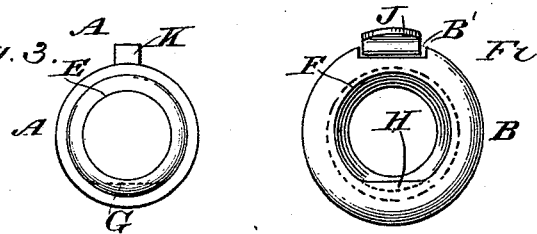
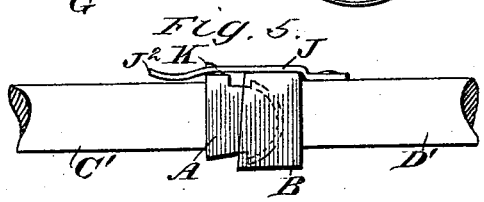
WITNESSES:
W. R. Davis.
C. Sedgwick
INVENTOR:
I. St. C. Goldman
BY Munn & Co
ATTORNEYS

UNITED STATES PATENT OFFICE.

ISAAC ST. CLAIR GOLDMAN, OF REDLANDS, CALIFORNIA, ASSIGNOR OF ONE-HALF TO CHARLES H. STONE, OF SAME PLACE.

COUPLING.

SPECIFICATION forming part of Letters Patent No. 461,751, dated October 20, 1891.

Application filed June 16, 1891. Serial No. 396,473. (No model.)

*To all whom it may concern:*

Be it known that I, ISAAC ST. CLAIR GOLDMAN, of Redlands, in the county of San Bernardino and State of California, have invented a new and Improved Coupling, of which the following is a full, clear, and exact description.

The object of the invention is to provide a new and improved coupling which is simple and durable in construction, permits of quickly and securely fastening the parts in place without leakage, and which is designed for use on hose, rods, &c.

The invention consists in a recessed female head having a lip adapted to be engaged by a hook formed on the other head and fitting into the said recess.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1 is a sectional side elevation of the improvement as applied to a hose. Fig. 2 is a plan view of the same. Fig. 3 is an end view of the male head. Fig. 4 is a similar view of the female head, and Fig. 5 is a reduced side elevation of the improvement as applied on solid rods.

The improved coupling is composed of two members A and B, adapted to connect with the hose parts C and D, respectively, or formed or fastened on solid rods C' and D', as illustrated in Fig. 5. The member A is formed with a head E, preferably made semicircular and fitting into a correspondingly-shaped recess F, formed in the other member B. On the head E and at the under side is cut a transversely-extending notch forming a hook G, adapted to engage a correspondingly-shaped lip H, extending transversely in the front end of the recess F of the member B. Into the recess F fits a washer I, engaged by the surface of the head E and serving to form a tight joint to prevent leakage between the two members A and B. The washer I preferably fits into an enlargement of the recess F, the lower end resting against the inside of the lip H, while the upper end rests against a corresponding lip H', as plainly shown in Fig. 1. Thus a displacement of the washer is prevented.

On the top of the member B is secured a spring-plate J, extending with its free end onto the member A and engaging with a recess J' a projection or hook K, held on the member A. The outer end of the spring-plate J is slightly curved upward so as to form a convenient handle J², adapted to be taken hold of by the operator so as to lift the said plate J out of engagement with the projection K whenever it is desired to uncouple the two parts.

In order to prevent sidewise displacement of the spring-plate J, the latter passes through a recess B', formed in the enlarged end of the member B. I do not limit myself to any particular form or shape of the head E and the corresponding recess or of the members A and B, as the said forms may be varied according to the nature of the parts to be coupled together. A different locking device instead of the one described may also be employed to hold the two members A and B in a locked or coupled position.

Having thus fully described my invention, I claim as new and desire to secure by Letters Patent—

1. A coupling comprising a female section having a semicircular recess in its end and provided with a lip, a male section provided with a semicircular head fitting in the recessed end of the female section and provided with a rigid hook engaging the lip of the said female section, and means for locking the two sections together, substantially as described.

2. A hose-coupling comprising two members, of which one is formed with a recess and is provided at the front end of the said recess with a transversely-extending lip, the other member being formed with a hook adapted to engage the said lip, its head fitting into the said recess, and a washer fitted into the said recess of one of the members to be engaged by the head of the other member to form a tight joint, substantially as shown and described.

3. A hose-coupling comprising two members, of which one is formed with a recess and is provided at the front end of the said recess with a transversely-extending lip, the other member being formed with a hook adapted to engage the said lip, its head fitting into the said recess, a washer fitted into the said recess of one of the members to be engaged by the head of the other member to form a tight joint, and a lock for fastening the two members together, substantially as shown and described.

ISAAC ST. CLAIR GOLDMAN.

Witnesses:
   G. W. KOEHLER,
   CHAS. E. TRUESDELL.